(12) United States Patent
Heyberger (10) Patent No.: US 12,210,644 B2
(45) Date of Patent: Jan. 28, 2025

(54) OBFUSCATION

(71) Applicant: Content Square SAS, Paris (FR)

(72) Inventor: Ludovic Heyberger, Paris (FR)

(73) Assignee: Content Square SAS, Paris (FR)

( * ) Notice: Subject to any disclaimer, the term of this patent is extended or adjusted under 35 U.S.C. 154(b) by 0 days.

(21) Appl. No.: 18/737,090

(22) Filed: Jun. 7, 2024

(65) Prior Publication Data

US 2024/0411913 A1 Dec. 12, 2024

Related U.S. Application Data (60) Provisional application No. 63/472,122, filed on Jun. 9, 2023.

(51) Int. Cl.
*G06F 21/62* (2013.01)

(52) U.S. Cl.
CPC .............................. *G06F 21/6218* (2013.01)

(58) Field of Classification Search
CPC .................................................. G06F 21/6218
See application file for complete search history.

(56) References Cited

U.S. PATENT DOCUMENTS

| | | | | |
|---|---|---|---|---|
| 5,768,564 A * | 6/1998 | Andrews | ................... | G06F 8/51 717/137 |
| 6,542,933 B1 * | 4/2003 | Durst, Jr. | ............ | G06F 16/9554 709/219 |
| 6,594,761 B1 * | 7/2003 | Chow | ..................... | G06F 21/14 713/189 |
| 7,689,969 B1 * | 3/2010 | Wendling | .................. | G06F 8/34 713/193 |
| 8,095,940 B2 * | 1/2012 | Bissett | .................. | G06F 9/4488 719/329 |
| 10,339,299 B1 * | 7/2019 | Magnuson | .............. | G06F 21/52 |
| 10,949,568 B1 * | 3/2021 | Peake, III | ........... | G06F 21/6254 |
| 11,461,481 B1 * | 10/2022 | Gounares | .................. | H04L 9/14 |
| 2005/0183072 A1 * | 8/2005 | Horning | .................. | G06F 21/10 717/140 |
| 2006/0048223 A1 * | 3/2006 | Lee | ......................... | G06F 21/14 726/22 |
| 2008/0028474 A1 * | 1/2008 | Horne | ................... | H04L 9/3226 726/27 |
| 2008/0208560 A1 * | 8/2008 | Johnson | .................. | G06F 21/14 703/22 |
| 2010/0228802 A1 * | 9/2010 | Bryant-Rich | ......... | G06F 16/162 711/E12.001 |
| 2011/0179403 A1 * | 7/2011 | Lerouge | .................. | G06F 21/14 717/141 |

(Continued)

*Primary Examiner* — Jason Chiang
(74) *Attorney, Agent, or Firm* — Schwegman Lundberg & Woessner, P.A.

(57) ABSTRACT

Embodiments herein describe a code obfuscation system. The code obfuscation system accesses computer code and identifies a subset of the code to obfuscate. The code obfuscation system analyzes the identified subset of code, the analysis comprising identifying code elements and identifying one or more files and directories. The code obfuscation system generates first obfuscation data for the identified code elements and generates second obfuscation data for the one or more files and directories. The code obfuscation system generates obfuscated computer code by applying the first obfuscation data and the second obfuscation data to the originally accessed computer code.

20 Claims, 6 Drawing Sheets

(56) References Cited

U.S. PATENT DOCUMENTS

| | | | |
|---|---|---|---|
| 2012/0265773 A1* | 10/2012 | McGlashan | G06F 16/2428 |
| | | | 707/754 |
| 2012/0311546 A1* | 12/2012 | Fanning | G06F 8/75 |
| | | | 717/136 |
| 2018/0373848 A1* | 12/2018 | Lafortune | G06F 21/629 |
| 2019/0050814 A1* | 2/2019 | Surkov | G06F 21/6254 |
| 2019/0228137 A1* | 7/2019 | Johansson | G06F 21/602 |
| 2020/0151007 A1* | 5/2020 | Johansson | G06F 9/30029 |
| 2021/0072971 A1* | 3/2021 | Jeong | G06F 8/427 |
| 2021/0097202 A1* | 4/2021 | Datta | G06F 21/36 |
| 2021/0133330 A1* | 5/2021 | Boulton | G06F 9/541 |
| 2021/0334342 A1* | 10/2021 | Hernvall | H04L 9/50 |
| 2022/0004367 A1* | 1/2022 | Webb | G06F 8/34 |
| 2022/0391176 A1* | 12/2022 | Gupte | G06F 8/34 |
| 2023/0017368 A1* | 1/2023 | Ballard | G06F 16/166 |
| 2023/0214484 A1* | 7/2023 | Hickie | G06F 21/14 |
| | | | 726/23 |
| 2024/0168740 A1* | 5/2024 | Gildea | G06F 8/447 |

* cited by examiner

OBFUSCATION

CLAIM OF PRIORITY

This Application claims the benefit of priority of U.S. Provisional Application Ser. No. 63/472,122, filed Jun. 9, 2023, which is hereby incorporated by reference in its entirety.

BACKGROUND

Obfuscation is the process of hiding sensitive language by replacing sensitive terms with elements that are not easily comprehensible to humans.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which.

DETAILED DESCRIPTION

Obfuscation is the process of hiding computer code by replacing variables, classes, and functions with elements that are not easily comprehensible to humans. The computer code would still compile because it would still be logical, but obfuscation prevents reverse-engineering efforts.

The obfuscated code still compiles and is logical, but is difficult to understand for a human. While it is challenging to quantify "difficulty" in a precise or universal way, there are some general indicators that an suggest a higher level of difficulty in understanding obfuscated code. A first indicator is time. The longer it takes for someone to understand or reverse engineer the code, the more "difficult" it is considered to be. A second indicator is resources and effort. The amount of mental and computational effort and resources require to deobfuscate the code can indicate its difficulty. This could be measured in terms of the complexity of the algorithms needed to reverse the obfuscation or the number of manual steps required. A third indicator is expertise. The level of expertise required to understand the obfuscated code can also indicate its difficulty. If understanding the code requires deep knowledge of obscure programming techniques or specific knowledge about the system in which the code runs, it could be considered more difficult.

In the context of mobile app development, it is common to obfuscate all of the app's code. However, obfuscating only a portion of the code is more complex challenge. Solutions herein describe an obfuscation system that obfuscates only sensitive or proprietary code components while keeping the necessary functionality and interfaces intact. The paragraphs below further describe an obfuscation system for obfuscating sensitive code components.

Networked Computing Environment

Figure 1:
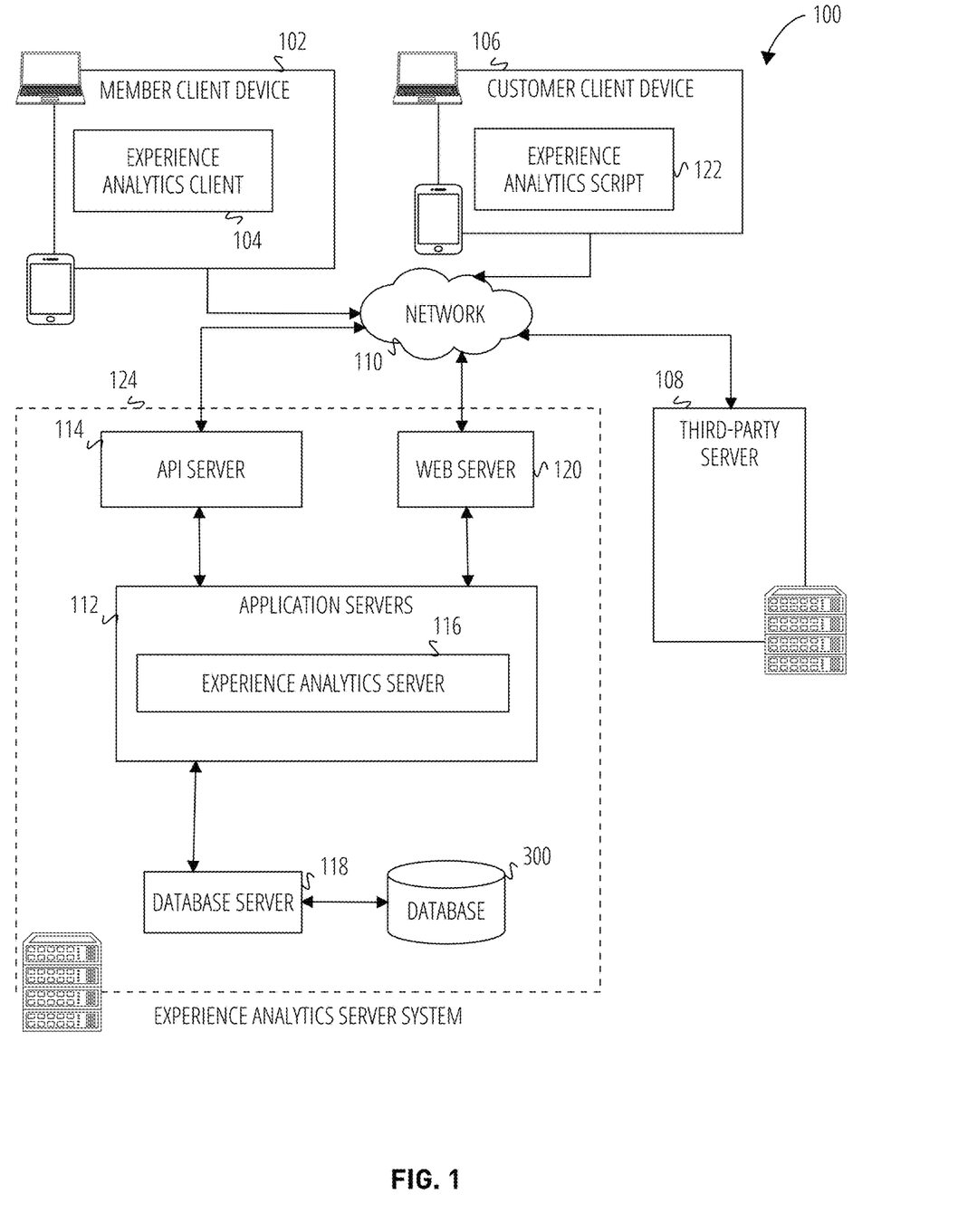
FIG. 1 is a diagrammatic representation of a networked environment in which the present disclosure may be deployed, in accordance with some examples.

FIG. 1 is a block diagram showing an example experience analytics system 100 that analyzes and quantifies the user experience of users navigating a client's website, mobile websites, and applications. The experience analytics system 100 can include multiple instances of a member client device 102, multiple instances of a customer client device 106, and multiple instances of a third-party server 108.

The member client device 102 is associated with a client of the experience analytics system 100, where the client that has a website hosted on the client's third-party server 108. For example, the client can be a retail store that has an online retail website that is hosted on a third-party server 108. An agent of the client (e.g., a web administrator, an employee, etc.) can be the user of the member client device 102.

Each of the member client devices 102 hosts a number of applications, including an experience analytics client 104. Each experience analytics client 104 is communicatively coupled with an experience analytics server system 124 and third-party servers 108 via a network 110 (e.g., the Internet). An experience analytics client 104 can also communicate with locally-hosted applications using Applications Program Interfaces (APIs).

The member client devices 102 and the customer client devices 106 can also host a number of applications including Internet browsing applications (e.g., Chrome, Safari, etc.). The experience analytics client 104 can also be implemented as a platform that is accessed by the member client device 102 via an Internet browsing application or implemented as an extension on the Internet browsing application.

Users of the customer client device 106 can access client's websites that are hosted on the third-party servers 108 via the network 110 using the Internet browsing applications. For example, the users of the customer client device 106 can navigate to a client's online retail website to purchase goods or services from the website. While the user of the customer client device 106 is navigating the client's website on an Internet browsing application, the Internet browsing application on the customer client device 106 can also execute a client-side script (e.g., JavaScript (.*js)) such as an experience analytics script 122. In one example, the experience analytics script 122 is hosted on the third-party server 108 with the client's website and processed by the Internet browsing application on the customer client device 106. The experience analytics script 122 can incorporate a scripting language (e.g., a .*js file or a .json file).

In certain examples, a client's native application (e.g., ANDROID™ or IOS™ Application) is downloaded on the customer client device 106. In this example, the client's native application including the experience analytics script 122 is programmed in JavaScript leveraging a Software Development Kit (SDK) provided by the experience analytics server system 124. The SDK includes Application Programming Interfaces (APIs) with functions that can be called or invoked by the client's native application.

In one example, the experience analytics script 122 records data including the changes in the interface of the website being displayed on the customer client device 106, the elements on the website being displayed or visible on the interface of the customer client device 106, the text inputs by the user into the website, a movement of a mouse (or touchpad or touch screen) cursor and mouse (or touchpad or touch screen) clicks on the interface of the website, etc. The experience analytics script 122 transmits the data to experience analytics server system 124 via the network 110. In another example, the experience analytics script 122 transmits the data to the third-party server 108 and the data can be transmitted from the third-party server 108 to the experience analytics server system 124 via the network 110.

An experience analytics client 104 is able to communicate and exchange data with the experience analytics server system 124 via the network 110. The data exchanged between the experience analytics client 104 and the experience analytics server system 124, includes functions (e.g., commands to invoke functions) as well as payload data (e.g., website data, texts reporting errors, insights, merchandising information, adaptability information, images, graphs providing visualizations of experience analytics, session replay videos, zoning and overlays to be applied on the website, etc.).

The experience analytics server system 124 supports various services and operations that are provided to the experience analytics client 104. Such operations include transmitting data to and receiving data from the experience analytics client 104. Data exchanges to and from the experience analytics server system 124 are invoked and controlled through functions available via user interfaces (UIs) of the experience analytics client 104.

The experience analytics server system 124 provides server-side functionality via the network 110 to a particular experience analytics client 104. While certain functions of the experience analytics system 100 are described herein as being performed by either an experience analytics client 104 or by the experience analytics server system 124, the location of certain functionality either within the experience analytics client 104 or the experience analytics server system 124 may be a design choice. For example, it may be technically preferable to initially deploy certain technology and functionality within the experience analytics server system 124 but to later migrate this technology and functionality to the experience analytics client 104 where a member client device 102 has sufficient processing capacity.

Turning now specifically to the experience analytics server system 124, an Application Program Interface (API) server 114 is coupled to, and provides a programmatic interface to, application servers 112. The application servers 112 are communicatively coupled to a database server 118, which facilitates access to a database 300 that stores data associated with experience analytics processed by the application servers 112. Similarly, a web server 120 is coupled to the application servers 112, and provides web-based interfaces to the application servers 112. To this end, the web server 120 processes incoming network requests over the Hypertext Transfer Protocol (HTTP) and several other related protocols.

The Application Program Interface (API) server 114 receives and transmits message data (e.g., commands and message payloads) between the member client device 102 and the application servers 112. Specifically, the Application Program Interface (API) server 114 provides a set of interfaces (e.g., routines and protocols) that can be called or queried by the experience analytics client 104 or the experience analytics script 122 in order to invoke functionality of the application servers 112. The Application Program Interface (API) server 114 exposes to the experience analytics client 104 various functions supported by the application servers 112, including generating information on errors, insights, merchandising information, adaptability information, images, graphs providing visualizations of experience analytics, session replay videos, zoning and overlays to be applied on the website, etc.

The application servers 112 host a number of server applications and subsystems, including for example an experience analytics server 116. The experience analytics server 116 implements a number of data processing technologies and functions, particularly related to the aggregation and other processing of data including the changes in the interface of the website being displayed on the customer client device 106, the elements on the website being displayed or visible on the interface of the customer client device 106, the text inputs by the user into the website, a movement of a mouse (or touchpad) cursor and mouse (or touchpad) clicks on the interface of the website, etc. received from multiple instances of the experience analytics script 122 on customer client devices 106. The experience analytics server 116 implements processing technologies and functions, related to generating user interfaces including information on errors, insights, merchandising information, adaptability information, images, graphs providing visualizations of experience analytics, session replay videos, zoning and overlays to be applied on the website, feedback provided by the user into feedback forms or widgets on the website, etc. Other processor and memory intensive processing of data may also be performed server-side by the experience analytics server 116, in view of the hardware requirements for such processing.

System Architecture

Figure 2:
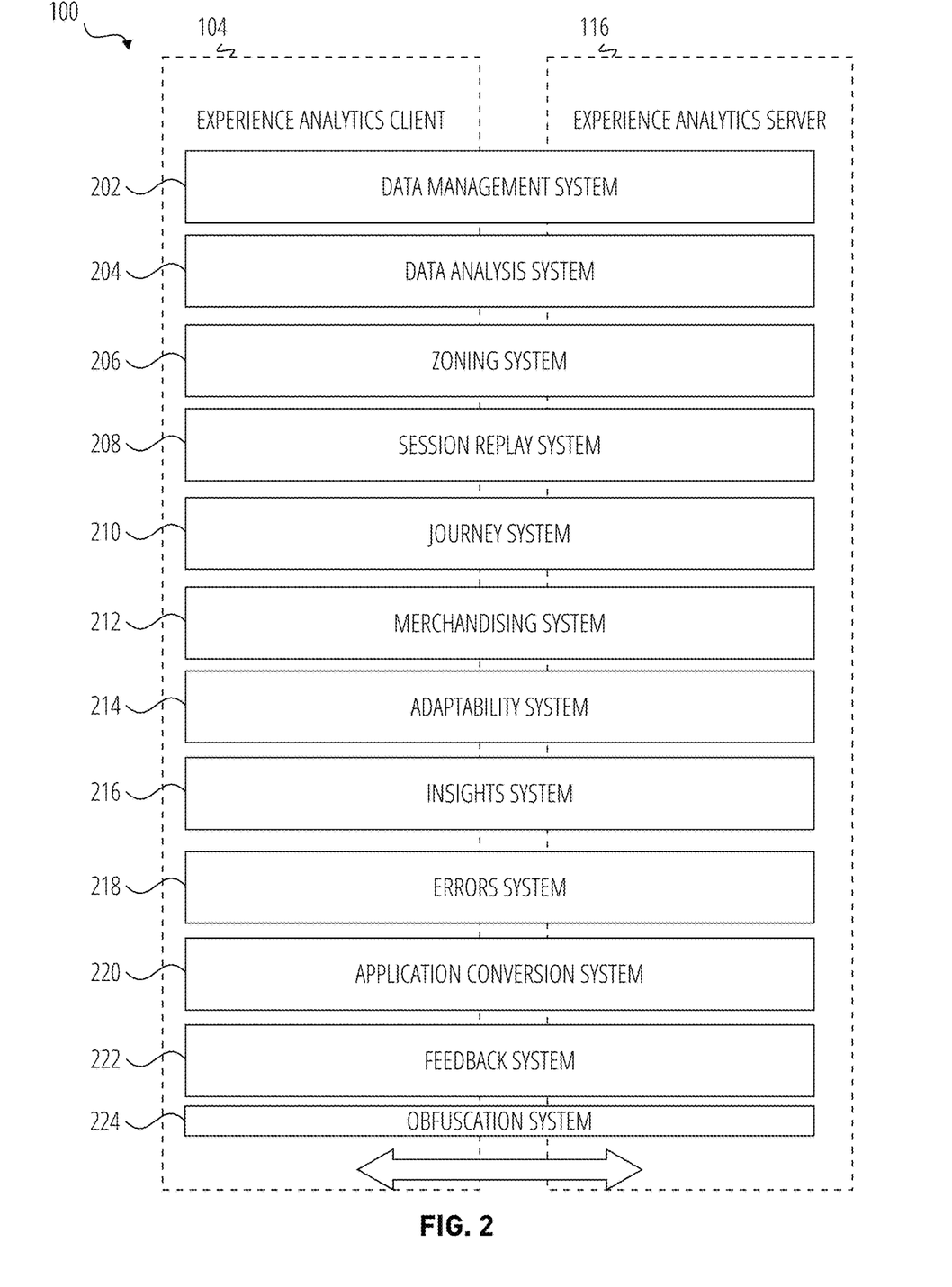
FIG. 2 is a diagrammatic representation of an experience analytics system, in accordance with some examples, that has both client-side and server-side functionality.

FIG. 2 is a block diagram illustrating further details regarding the experience analytics system 100 according to some examples. Specifically, the experience analytics system 100 is shown to comprise the experience analytics client 104 and the experience analytics server 116. The experience analytics system 100 embodies a number of subsystems, which are supported on the client-side by the experience analytics client 104 and on the server-side by the experience analytics server 116. These subsystems include, for example, a data management system 202, a data analysis system 204, a zoning system 206, a session replay system 208, a journey system 210, a merchandising system 212, an adaptability system 214, an insights system 216, an errors system 218, an application conversion system 220, and a feedback system 222.

The data management system 202 is responsible for receiving functions or data from the member client devices 102, the experience analytics script 122 executed by each of the customer client devices 106, and the third-party servers 108. The data management system 202 is also responsible for exporting data to the member client devices 102 or the third-party servers 108 or between the systems in the experience analytics system 100. The data management system 202 is also configured to manage the third-party integration of the functionalities of experience analytics system 100.

The data analysis system 204 is responsible for analyzing the data received by the data management system 202, generating data tags, performing data science and data engineering processes on the data.

The zoning system 206 is responsible for generating a zoning interface to be displayed by the member client device 102 via the experience analytics client 104. The zoning interface provides a visualization of how the users via the customer client devices 106 interact with each element on the client's website. The zoning interface can also provide an aggregated view of in-page behaviors by the users via the customer client device 106 (e.g., clicks, scrolls, navigation). The zoning interface can also provide a side-by-side view of different versions of the client's website for the client's analysis. For example, the zoning system 206 can identify the zones in a client's website that are associated with a particular element in displayed on the website (e.g., an icon, a text link, etc.). Each zone can be a portion of the website being displayed. The zoning interface can include a view of the client's website. The zoning system 206 can generate an overlay including data pertaining to each of the zones to be overlaid on the view of the client's website. The data in the overlay can include, for example, the number of views or clicks associated with each zone of the client's website within a period of time, which can be established by the user of the member client device 102. In one example, the data can be generated using information from the data analysis system 204.

The session replay system 208 is responsible for generating the session replay interface to be displayed by the member client device 102 via the experience analytics client 104. The session replay interface includes a session replay that is a video reconstructing an individual user's session (e.g., visitor session) on the client's website. The user's session starts when the user arrives into the client's website and ends upon the user's exit from the client's website. A user's session when visiting the client's website on a customer client device 106 can be reconstructed from the data received from the user's experience analytics script 122 on customer client devices 106. The session replay interface can also include the session replays of a number of different visitor sessions to the client's website within a period of time (e.g., a week, a month, a quarter, etc.). The session replay interface allows the client via the member client device 102 to select and view each of the session replays. In one example, the session replay interface can also include an identification of events (e.g., failed conversions, angry customers, errors in the website, recommendations or insights) that are displayed and allow the user to navigate to the part in the session replay corresponding to the events such that the client can view and analyze the event.

The journey system 210 is responsible for generating the journey interface to be displayed by the member client device 102 via the experience analytics client 104. The journey interface includes a visualization of how the visitors progress through the client's website, page-by-page, from entry onto the website to the exit (e.g., in a session). The journey interface can include a visualization that provides a customer journey mapping (e.g., sunburst visualization). This visualization aggregates the data from all of the visitors (e.g., users on different customer client devices 106) to the website and illustrates the visited pages in the order in which the pages were visited. The client viewing the journey interface on the member client device 102 can identify anomalies such as looping behaviors and unexpected drop-offs. The client viewing the journey interface can also assess the reverse journeys (e.g., pages visitors viewed before arriving at a particular page). The journey interface also allows the client to select a specific segment of the visitors to be displayed in the visualization of the customer journey.

The merchandising system 212 is responsible for generating the merchandising interface to be displayed by the member client device 102 via the experience analytics client 104. The merchandising interface includes merchandising analysis that provides the client with analytics on the merchandise to be promoted on the website, optimization of sales performance, the items in the client's product catalog on a granular level, competitor pricing, etc. The merchandising interface can, for example, comprise graphical data visualization pertaining to product opportunities, category, brand performance, etc. For instance, the merchandising interface can include the analytics on conversions (e.g., sales, revenue) associated with a placement or zone in the client website.

The adaptability system 214 is responsible for creating accessible digital experiences for the client's website to be displayed by the customer client devices 106 for visitors that would benefit from an accessibility-enhanced version of the client's website. For instance, the adaptability system 214 can improve the digital experience for users with disabilities, such as visual impairments, cognitive disorders, dyslexia, and age-related needs. The adaptability system 214 can, with proper user permissions, analyze the data from the experience analytics script 122 to determine whether an accessibility-enhanced version of the client's website is needed, and can generate the accessibility-enhanced version of the client's website to be displayed by the customer client device 106.

The insights system 216 is responsible for analyzing the data from the data management system 202 and the data analysis system 204 surface insights that include opportunities as well as issues that are related to the client's website. The insights can also include alerts that notify the client of deviations from a client's normal business metrics. The insights can be displayed by the member client devices 102 via the experience analytics client 104 on a dashboard of a user interface, as a pop-up element, as a separate panel, etc. In this example, the insights system 216 is responsible for generating an insights interface to be displayed by the member client device 102 via the experience analytics client 104. In another example, the insights can be incorporated in another interface such as the zoning interface, the session replay, the journey interface, or the merchandising interface to be displayed by the member client device 102.

The errors system 218 is responsible for analyzing the data from the data management system 202 and the data analysis system 204 to identify errors that are affecting the visitors to the client's website and the impact of the errors on the client's business (e.g., revenue loss). The errors can include the location within the user journey in the website and the page that adversely affects (e.g., causes frustration for) the users (e.g., users on customer client devices 106 visiting the client's website). The errors can also include causes of looping behaviors by the users, in-page issues such as unresponsive calls to action and slow loading pages, etc. The errors can be displayed by the member client devices 102 via the experience analytics client 104 on a dashboard of a user interface, as a pop-up element, as a separate panel, etc. In this example, the errors system 218 is responsible for generating an errors interface to be displayed by the member client device 102 via the experience analytics client 104. In another example, the insights can be incorporated in another interface such as the zoning interface, the session replay, the journey interface, or the merchandising interface to be displayed by the member client device 102.

The application conversion system 220 is responsible for the conversion of the functionalities of the experience analytics server 116 as provided to a client's website to a client's native mobile applications. For instance, the application conversion system 220 generates the mobile application version of the zoning interface, the session replay, the journey interface, the merchandising interface, the insights interface, and the errors interface to be displayed by the member client device 102 via the experience analytics client 104. The application conversion system 220 generates an accessibility-enhanced version of the client's mobile application to be displayed by the customer client devices 106. The application conversion system 220 can include an obfuscation system that obfuscates a portion of code in a body of code. The obfuscation system can also obfuscate imports, dart files and folders. Further details are described in connection with FIG. 4 and in the addendum.

The feedback system 222 is responsible for receiving and analyzing data from the data management system 202 that includes the feedback data received from the client devices. As the visitor progresses through a client's website on the client device, a feedback webpage of the website, a pop-up window or tab, or an overlay can be displayed to receive the visitor's feedback. For instance, a feedback form can be displayed in a pop-up window or tab of the website, an overlay of the website, one of the plurality of webpages of the website, etc. The visitor can provide feedback on, for example, the functionality of the website, aesthetics of the website, on the goods and services associated with the website, etc. The feedback data can include a text input that is included into a feedback form on the website. The feedback data can also include a survey response, a rating that includes an image, an emoticon, or an icon, a screenshot of one of the plurality of webpages, etc. The feedback system 222 is also responsible for generating feedback interfaces to be displayed by the member client device 102 via the experience analytics client 104.

The obfuscation system obfuscates a portion of code in a body of code. In one example, the obfuscation system can obfuscate imports, DART files, and folders.

Further details on the functions of the obfuscation system are described in connection with FIG. 4

Data Architecture

Figure 3:
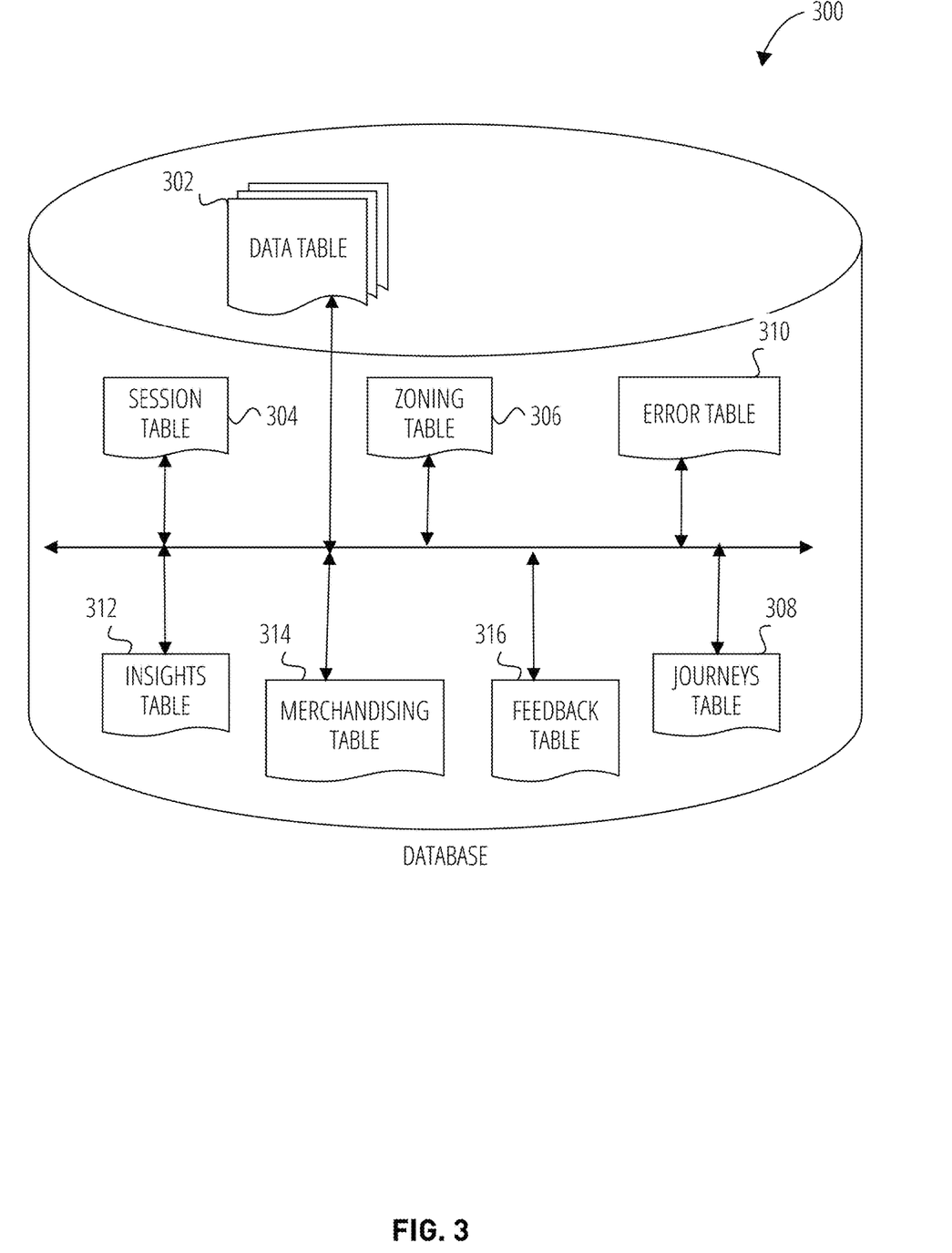
FIG. 3 is a diagrammatic representation of a data structure as maintained in a database, in accordance with some examples.

FIG. 3 is a schematic diagram illustrating database 300, which may be stored in the database 300 of the experience analytics server 116, according to certain examples. While the content of the database 300 is shown to comprise a number of tables, it will be appreciated that the data could be stored in other types of data structures (e.g., as an object-oriented database).

The database 300 includes a data table 302, a session table 304, a zoning table 306, an error table 310, an insights table 312, a merchandising table 314, and a journeys table 308.

The data table 302 stores data regarding the websites and native applications associated with the clients of the experience analytics system 100. The data table 302 can store information on the contents of the website or the native application, the changes in the interface of the website being displayed on the customer client device 106, the elements on the website being displayed or visible on the interface of the customer client device 106, the text inputs by the user into the website, a movement of a mouse (or touchpad or touch screen) cursor and mouse (or touchpad or touch screen) clicks on the interface of the website, etc. The data table 302 can also store data tags and results of data science and data engineering processes on the data. The data table 302 can also store information such as the font, the images, the videos, the native scripts in the website or applications, etc.

The session table 304 stores session replays for each of the client's websites and native applications.

The zoning table 306 stores data related to the zoning for each of the client's websites and native applications including the zones to be created and the zoning overlay associated with the websites and native applications.

The journeys table 308 stores data related to the journey of each visitor to the client's website or through the native application.

The error table 310 stores data related to the errors generated by the errors system 218 and the insights table 312 stores data related to the insights generated by the insights table 312.

The merchandising table 314 stores data associated with the merchandising system 212. For example, the data in the merchandising table 314 can include the product catalog for each of the clients, information on the competitors of each of the clients, the data associated with the products on the websites and applications, the analytics on the product opportunities and the performance of the products based on the zones in the website or application, etc.

The feedback table 316 stores data associated with the feedback system 222. For example, the data in the feedback table 316 can include the feedback data received from each of the customer client devices 106 and stored in association with the customer client device 106 and the website associated with the customer client device 106. The feedback data can include, for example, the text input that provides the visitor's (or customer's) feedback on the website, survey response, rating that includes an image, an emoticon, or an icon, a screenshot of one of the plurality of webpages, etc.

Process of Obfuscating a Portion of Code

Although the described flowcharts can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems.

Figure 4:
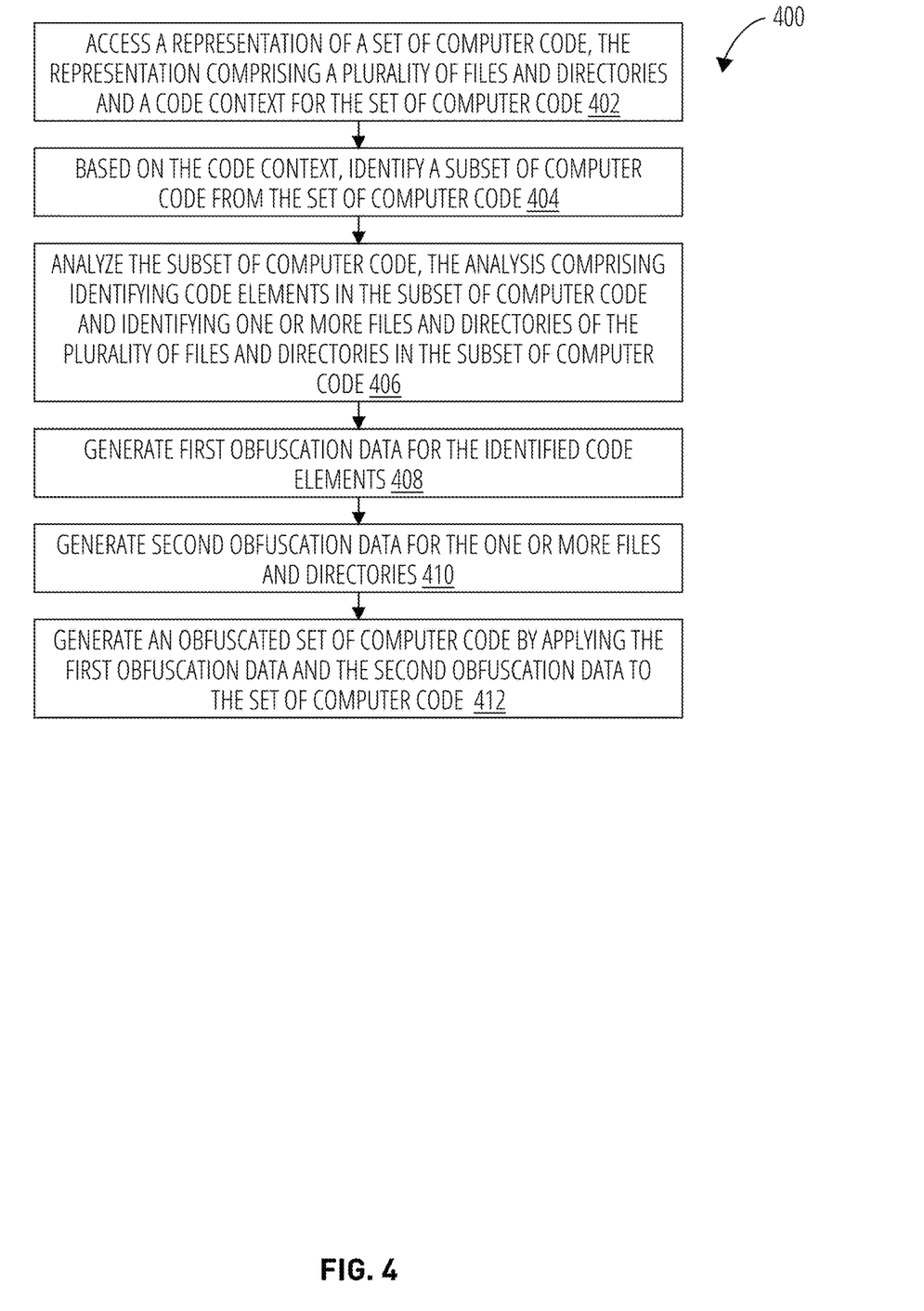
FIG. 4 illustrates a method for obfuscating a portion of code in a body of code, in accordance with some examples.

FIG. 4 illustrates a process 400 for obfuscating a portion of code in a body of code, in accordance with one example. In one example, the processor in an experience analytics system 100, the processor in a member client device 102, the processor in a customer client device 106 the processor in an obfuscation system 224 can perform the operations in process 400.

In operation 402, the processor accesses a representation of a set of computer code, the representation comprising a plurality of files and directories and a code context for the set of computer code. For example, the obfuscation system 224 accesses a body of code to be obfuscated. The obfuscation system 224 generates a representation of the body of code and the code context in which the code is to be analyzed. The body of code is represented as a collection of files and directories, as defined by the list of included paths. If the list of included paths contains one or more directories, then zero or more files or directories within the included directories can be excluded from analysis, as defined by the list of excluded paths.

In operation 404, the processor based on the code context, identifies a subset of computer code from the set of computer code. For each code file in the body of code, the obfuscation system retrieves a syntax tree that is composed of nodes that describe the content of the code file. Each node is related to a subset of computer code from the set of code. To obfuscate, the obfuscation system 224 parses this tree by searching for the nodes that need to be obfuscated. With the help of the code context, the obfuscation system retrieves root nodes of the syntax trees that are root nodes of each code file.

In operation 406, the processor analyzes the subset of computer code, the analysis comprising identifying code elements in the subset of computer code and identifying one or more files and directories of the plurality of files and directories in the subset of computer code. The root nodes are associated with an element property. The obfuscation system 224 retrieves elements from the retrieved root nodes and obfuscates the code elements. Code elements include class names, variable names, function names, and the like. The obfuscation system 224 additionally performs obfuscation on the paths of the given code files (e.g., imports, filenames, directories).

In operation 408, the processor generates first obfuscation data for the identified code elements. To obfuscate code elements, the obfuscation system 224 retrieves all commented elements such as classes, enums, mixins, extensions, executables, variables, and the like. Some of the elements may have documentation comments. The obfuscation system 224 subsequently retrieves all exported elements. Exported elements may be elements that are stored in a specific folder, elements that are explicitly exported, and elements that have predefined annotations. The obfuscation system 224 splits all the retrieved elements into two categories: those which are overridable, and those which are not.

For those which are overridable, the obfuscation system 224 creates graphs of elements based on their inheritance links. For example, all methods that are linked by inheritance (overridden by each other) are packed in the same graph and will be obfuscated the same way. The exported elements are used to filter the graphs in order to keep the graphs that do not contain exported elements so that the obfuscation system 224 can obfuscate the kept graphs.

For those which are not overridable, the obfuscation system 224 uses the exported elements to filter them in order to keep only those to be obfuscated. After having the overridable and non-overridable list of elements to be obfuscated, the obfuscation system creates graphs for all elements. After obtaining the graphs, the obfuscation system 224 creates an object which holds the element's original name and an obfuscated name (e.g., randomized string replacement).

For every commented element that contains elements to obfuscate, the obfuscation system 224 deletes the documentation comments. In parallel, the obfuscation system 224 retrieves all end of the line comments and all blocs comments and deletes them.

The obfuscation system 224 creates a set of renaming information for renaming a specific code fragment. The list of information includes precise positioning of a code snippet that should be obfuscated (e.g., file name, offset, and length), and the obfuscated names associated with the code snippet. Based on the set of renaming information, the obfuscation system 224 obfuscates the code. Obfuscating the code includes removing all documentation and comments and replacing original element names with their corresponding obfuscated names.

In operation 410, the processor generates second obfuscation data for the one or more files and directories. To obfuscate paths of given code files, the obfuscation system 224 filters elements that represent specific file types that exist inside of specific folders. For each element, the obfuscation system identifies path information for those elements. The obfuscation system 224 obfuscates the path information by obfuscating the file name, shrinking the file path, and wrapping the new file path into an obfuscated file path. Based on the original file path and the obfuscated file path, the obfuscation system 224 creates path renaming data which includes the original file path name and the obfuscated file path name. The obfuscation system 224 creates a set of renaming information for renaming the file paths. The renaming information for the file paths may be similar to the renaming information for the code fragments as described above. In accordance with the renaming information, the obfuscation system 224 performs obfuscation on the file paths. Obfuscation of file paths includes renaming file names and moving them to their new, obfuscated file path and removing internal directories.

In operation 412, the processor generates an obfuscated set of computer code by applying the first obfuscation data and the second obfuscation data to the set of computer code.

In some examples, in generating the first obfuscation data the obfuscation system 224 identifies a first subset of elements from the code elements and second subset of elements from the code elements, the first subset of elements comprising a first type of data, and the second subset of elements comprising a second type of data. The obfuscation system 224 generates a combined subset of elements, the combined subset of elements generated based on computing a union of the first subset of elements and the second subset of elements. The obfuscation system 224 generates a plurality of graphs comprising candidate elements in the combined subset of elements, each graph in the plurality of graphs generated based on inheritance links associated with the candidate elements. The obfuscation system 224 identifies one or more graphs in the plurality of graphs based on predefined element characteristics associated with the candidate elements. For each candidate element in the identified one or more graphs. The obfuscation system 224 generates a data item, the data item comprising an original name associated with the candidate element and an obfuscation name, and the obfuscation system 224 replaces the original name associated with the candidate element with the obfuscation name.

When dealing with obfuscation, there must be a solution for de-obfuscating the code. In some examples, the solution involves having a file which is a map containing all the original names and their obfuscated values.

Machine Architecture

Figure 5:
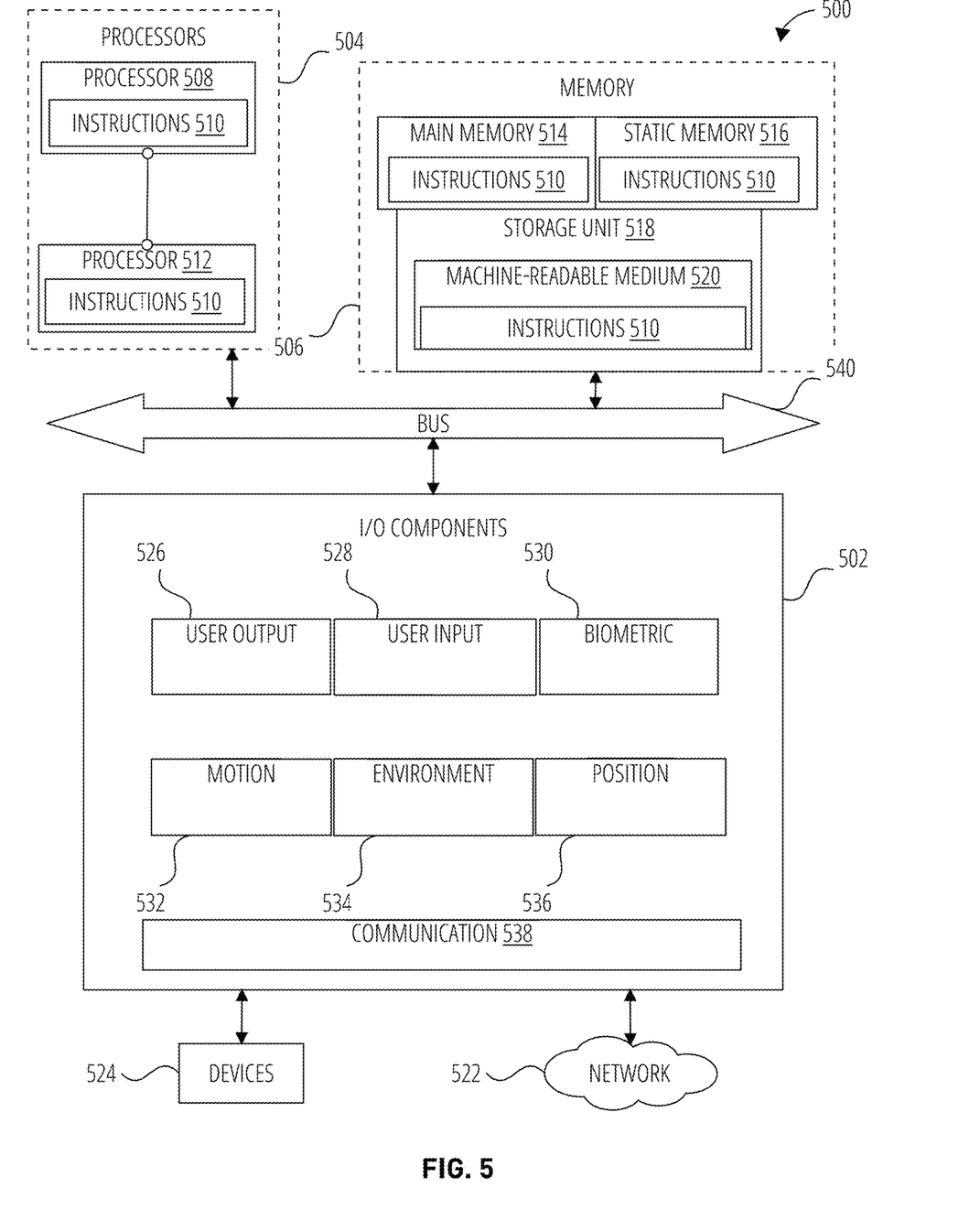
FIG. 5 is a diagrammatic representation of a machine in the form of a computer system within which a set of instructions may be executed for causing the machine to perform any one or more of the methodologies discussed herein, in accordance with some examples.

FIG. 5 is a diagrammatic representation of the machine 500 within which instructions 510 (e.g., software, a program, an application, an applet, an application, or other executable code) for causing the machine 500 to perform any one or more of the methodologies discussed herein may be executed. For example, the instructions 510 may cause the machine 500 to execute any one or more of the methods described herein. The instructions 510 transform the general, non-programmed machine 500 into a particular machine 500 programmed to carry out the described and illustrated functions in the manner described. The machine 500 may operate as a standalone device or may be coupled (e.g., networked) to other machines. In a networked deployment, the machine 500 may operate in the capacity of a server machine or a client machine in a server-client network environment, or as a peer machine in a peer-to-peer (or distributed) network environment. The machine 500 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 510, sequentially or otherwise, that specify actions to be taken by the machine 500. Further, while only a single machine 500 is illustrated, the term "machine" shall also be taken to include a collection of machines that individually or jointly execute the instructions 510 to perform any one or more of the methodologies discussed herein. The machine 500, for example, may comprise the member client device 102 or any one of a number of server devices forming part of the experience analytics server 116. In some examples, the machine 500 may also comprise both client and server systems, with certain operations of a particular method or algorithm being performed on the server-side and with certain operations of the particular method or algorithm being performed on the client-side.

The machine 500 may include processors 504, memory 506, and input/output I/O components 502, which may be configured to communicate with each other via a bus 540. In an example, the processors 504 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 508 and a processor 512 that execute the instructions 510. The term "processor" is intended to include multi-core processors that may comprise two or more independent processors (sometimes referred to as "cores") that may execute instructions contemporaneously. Although FIG. 5 shows multiple processors 504, the machine 500 may include a single processor with a single-core, a single processor with multiple cores (e.g., a multi-core processor), multiple processors with a single core, multiple processors with multiples cores, or any combination thereof.

The memory 506 includes a main memory 514, a static memory 516, and a storage unit 518, both accessible to the processors 504 via the bus 540. The main memory 514, the static memory 516, and storage unit 518 store the instructions 510 embodying any one or more of the methodologies or functions described herein. The instructions 510 may also reside, completely or partially, within the main memory 514, within the static memory 516, within machine-readable medium 520 within the storage unit 518, within at least one of the processors 504 (e.g., within the processor's cache memory), or any suitable combination thereof, during execution thereof by the machine 500.

The I/O components 502 may include a wide variety of components to receive input, provide output, produce output, transmit information, exchange information, capture measurements, and so on. The specific I/O components 502 that are included in a particular machine will depend on the type of machine. For example, portable machines such as mobile phones may include a touch input device or other such input mechanisms, while a headless server machine will likely not include such a touch input device. It will be appreciated that the I/O components 502 may include many other components that are not shown in FIG. 5. In various examples, the I/O components 502 may include user output components 526 and user input components 528. The user output components 526 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 528 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 502 may include biometric components 530, motion components 532, environmental components 534, or position components 536, among a wide array of other components. For example, the biometric components 530 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 532 include acceleration sensor components (e.g., accelerometer), gravitation sensor components, rotation sensor components (e.g., gyroscope).

The environmental components 534 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the member client device 102 may have a camera system comprising, for example, front cameras on a front surface of the member client device 102 and rear cameras on a rear surface of the member client device 102. The front cameras may, for example, be used to capture still images and video of a user of the member client device 102 (e.g., "selfies"). The rear cameras may, for example, be used to capture still images and videos in a more traditional camera mode. In addition to front and rear cameras, the member client device 102 may also include a 360° camera for capturing 360° photographs and videos.

Further, the camera system of a member client device 102 may include dual rear cameras (e.g., a primary camera as well as a depth-sensing camera), or even triple, quad or penta rear camera configurations on the front and rear sides of the member client device 102. These multiple cameras systems may include a wide camera, an ultra-wide camera, a telephoto camera, a macro camera and a depth sensor, for example.

The position components 536 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 502 further include communication components 538 operable to couple the machine 500 to a network 522 or devices 524 via respective coupling or connections. For example, the communication components 538 may include a network interface component or another suitable device to interface with the network 522. In further examples, the communication components 538 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 524 may be another machine or any of a wide variety of peripheral devices (e.g., a peripheral device coupled via a USB).

Moreover, the communication components 538 may detect identifiers or include components operable to detect identifiers. For example, the communication components 538 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 538, such as location via Internet Protocol (IP) geolocation, location via Wi-Fi® signal triangulation, location via detecting an NFC beacon signal that may indicate a particular location, and so forth.

The various memories (e.g., main memory 514, static memory 516, and memory of the processors 504) and storage unit 518 may store one or more sets of instructions and data structures (e.g., software) embodying or used by any one or more of the methodologies or functions described herein. These instructions (e.g., the instructions 510), when executed by processors 504, cause various operations to implement the disclosed examples.

The instructions 510 may be transmitted or received over the network 522, using a transmission medium, via a network interface device (e.g., a network interface component included in the communication components 538) and using any one of several well-known transfer protocols (e.g., hypertext transfer protocol (HTTP)). Similarly, the instructions 510 may be transmitted or received using a transmission medium via a coupling (e.g., a peer-to-peer coupling) to the devices 524.

Software Architecture

Figure 6:
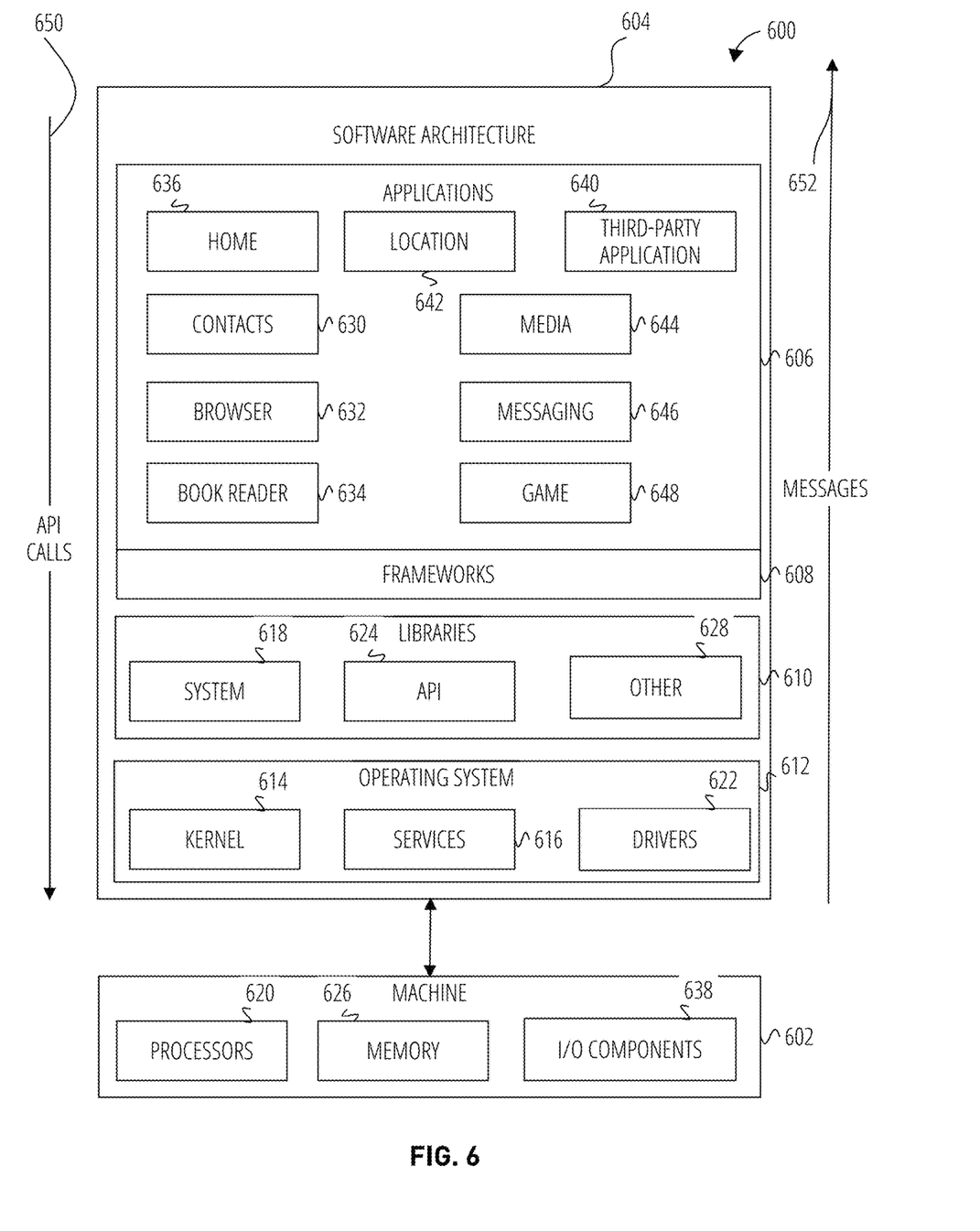
FIG. 6 is a block diagram showing a software architecture within which examples may be implemented.

FIG. 6 is a block diagram 600 illustrating a software architecture 604, which can be installed on any one or more of the devices described herein. The software architecture 604 is supported by hardware such as a machine 602 that includes processors 620, memory 626, and I/O components 638. In this example, the software architecture 604 can be conceptualized as a stack of layers, where each layer provides a particular functionality. The software architecture 604 includes layers such as an operating system 612, libraries 610, frameworks 608, and applications 606. Operationally, the applications 606 invoke API calls 650 through the software stack and receive messages 652 in response to the API calls 650.

The operating system 612 manages hardware resources and provides common services. The operating system 612 includes, for example, a kernel 614, services 616, and drivers 622. The kernel 614 acts as an abstraction layer between the hardware and the other software layers. For example, the kernel 614 provides memory management, processor management (e.g., scheduling), component management, networking, and security settings, among other functionalities. The services 616 can provide other common services for the other software layers. The drivers 622 are responsible for controlling or interfacing with the underlying hardware. For instance, the drivers 622 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 610 provide a common low-level infrastructure used by the applications 606. The libraries 610 can include system libraries 618 (e.g., C standard library) that provide functions such as memory allocation functions, string manipulation functions, mathematic functions, and the like. In addition, the libraries 610 can include API libraries 624 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 610 can also include a wide variety of other libraries 628 to provide many other APIs to the applications 606.

The frameworks 608 provide a common high-level infrastructure that is used by the applications 606. For example, the frameworks 608 provide various graphical user interface (GUI) functions, high-level resource management, and high-level location services. The frameworks 608 can provide a broad spectrum of other APIs that can be used by the applications 606, some of which may be specific to a particular operating system or platform.

In an example, the applications 606 may include a home application 636, a contacts application 630, a browser application 632, a book reader application 634, a location application 642, a media application 644, a messaging application 646, a game application 648, and a broad assortment of other applications such as a third-party application 640. The applications 606 are programs that execute functions defined in the programs. Various programming languages can be employed to create one or more of the applications 606, structured in a variety of manners, such as object-oriented programming languages (e.g., Objective-C, Java, or C++) or procedural programming languages (e.g., C or assembly language). In a specific example, the third-party application 640 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 640 can invoke the API calls 650 provided by the operating system 612 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1004 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method comprising:
   accessing a representation of a set of computer code, the representation comprising a plurality of files and directories and a code context for the set of computer code;
   based on the code context, identifying a subset of computer code from the set of computer code;
   analyzing the subset of computer code, the analysis comprising identifying code elements in the subset of computer code and identifying one or more files and directories of the plurality of files and directories in the subset of computer code;
   generating first obfuscation data for the identified code elements, wherein generating the first obfuscation data comprises:
      generating renaming information for the identified code elements, the renaming information comprising offsets and lengths of code for the identified code element and obfuscated names for the identified code elements;
   generating second obfuscation data for the one or more files and directories; and
   generating an obfuscated set of computer code by applying the first obfuscation data and the second obfuscation data to the set of computer code.

2. The method of claim 1, wherein generating first obfuscation data comprises:
   identifying a first subset of elements from the code elements and second subset of elements from the code elements, the first subset of elements comprising a first type of data, and the second subset of elements comprising a second type of data;
   generating a combined subset of elements, the combined subset of elements generated based on computing a union of the first subset of elements and the second subset of elements;
   generating a plurality of graphs comprising candidate elements in the combined subset of elements, each graph in the plurality of graphs generated based on inheritance links associated with the candidate elements;
   identifying one or more graphs in the plurality of graphs based on predefined element characteristics associated with the candidate elements;
   for each candidate element in the identified one or more graphs:
   generating a data item, the data item comprising an original name associated with the candidate element and an obfuscation name; and
   replacing the original name associated with the candidate element with the obfuscation name.

3. The method of claim 1, further comprising:
   removing documentation data and comment data from the subset of computer code.

4. The method of claim 1, further comprising:
   storing a first mapping of the first obfuscation data and the identified code elements in a first database; and storing a second mapping of the second obfuscation data and the identified one or more files and directories in a second database.

5. The method of claim 1, wherein generating first obfuscation data comprises:
generating a first graph comprising a first subset of code elements from the identified code elements;
identifying exported elements from the identified code elements; and
filtering the first graph based on the exported elements.

6. The method of claim 1, wherein the second obfuscation data comprises obfuscated file path names.

7. The method of claim 1, wherein generating the second obfuscation data further comprises:
shrinking a file path for the one or more files and directories.

8. A system comprising:
a processor; and
a memory storing instructions that, when executed by the processor, cause the system to perform operations comprising:
accessing a representation of a set of computer code, the representation comprising a plurality of files and directories and a code context for the set of computer code;
based on the code context, identifying a subset of computer code from the set of computer code;
analyzing the subset of computer code, the analysis comprising identifying code elements in the subset of computer code and identifying one or more files and directories of the plurality of files and directories in the subset of computer code;
generating first obfuscation data for the identified code elements, wherein generating the first obfuscation data comprises:
generating renaming information for the identified code elements, the renaming information comprising offsets and lengths of code for the identified code element and obfuscated names for the identified code elements;
generating second obfuscation data for the one or more files and directories; and
generating an obfuscated set of computer code by applying the first obfuscation data and the second obfuscation data to the set of computer code.

9. The system of claim 8, wherein generating first obfuscation data comprises:
identifying a first subset of elements from the code elements and second subset of elements from the code elements, the first subset of elements comprising a first type of data, and the second subset of elements comprising a second type of data;
generating a combined subset of elements, the combined subset of elements generated based on computing a union of the first subset of elements and the second subset of elements;
generating a plurality of graphs comprising candidate elements in the combined subset of elements, each graph in the plurality of graphs generated based on inheritance links associated with the candidate elements;
identifying one or more graphs in the plurality of graphs based on predefined element characteristics associated with the candidate elements;
for each candidate element in the identified one or more graphs:

generating a data item, the data item comprising an original name associated with the candidate element and an obfuscation name; and
replacing the original name associated with the candidate element with the obfuscation name.

10. The system of claim 9, further comprising:
removing documentation data and comment data from the subset of computer code.

11. The system of claim 9, further comprising:
storing a first mapping of the first obfuscation data and the identified code elements in a first database; and
storing a second mapping of the second obfuscation data and the identified one or more files and directories in a second database.

12. The system of claim 9, wherein generating first obfuscation data comprises:
generating a first graph comprising a first subset of code elements from the identified code elements;
identifying exported elements from the identified code elements; and
filtering the first graph based on the exported elements.

13. The system of claim 9, wherein the second obfuscation data comprises obfuscated file path names.

14. The system of claim 9, wherein generating the second obfuscation data further comprises:
shrinking a file path for the one or more files and directories.

15. A non-transitory computer-readable storage medium including instructions that when executed by a processor, cause the processor to perform operations comprising:
accessing a representation of a set of computer code, the representation comprising a plurality of files and directories and a code context for the set of computer code;
based on the code context, identifying a subset of computer code from the set of computer code;
analyzing the subset of computer code, the analysis comprising identifying code elements in the subset of computer code and identifying one or more files and directories of the plurality of files and directories in the subset of computer code;
generating first obfuscation data for the identified code elements, wherein generating the first obfuscation data comprises:
generating renaming information for the identified code elements, the renaming information comprising offsets and lengths of code for the identified code element and obfuscated names for the identified code elements;
generating second obfuscation data for the one or more files and directories; and
generating an obfuscated set of computer code by applying the first obfuscation data and the second obfuscation data to the set of computer code.

16. The non-transitory computer-readable storage medium of claim 15, wherein generating first obfuscation data comprises:
identifying a first subset of elements from the code elements and second subset of elements from the code elements, the first subset of elements comprising a first type of data, and the second subset of elements comprising a second type of data;
generating a combined subset of elements, the combined subset of elements generated based on computing a union of the first subset of elements and the second subset of elements;
generating a plurality of graphs comprising candidate elements in the combined subset of elements, each graph in the plurality of graphs generated based on inheritance links associated with the candidate elements;

identifying one or more graphs in the plurality of graphs based on predefined element characteristics associated with the candidate elements;

for each candidate element in the identified one or more graphs:

generating a data item, the data item comprising an original name associated with the candidate element and an obfuscation name; and replacing the original name associated with the candidate element with the obfuscation name.

17. The non-transitory computer-readable storage medium of claim 15, further comprising:

removing documentation data and comment data from the subset of computer code.

18. The non-transitory computer-readable storage medium of claim 15, further comprising:

storing a first mapping of the first obfuscation data and the identified code elements in a first database; and storing a second mapping of the second obfuscation data and the identified one or more files and directories in a second database.

19. The non-transitory computer-readable storage medium of claim 15, wherein generating first obfuscation data comprises:

generating a first graph comprising a first subset of code elements from the identified code elements;

identifying exported elements from the identified code elements; and filtering the first graph based on the exported elements.

20. The non-transitory computer-readable storage medium of claim 15, wherein the second obfuscation data comprises obfuscated file path names.

* * * * *

UNITED STATES PATENT AND TRADEMARK OFFICE
CERTIFICATE OF CORRECTION

PATENT NO. : 12,210,644 B2  
APPLICATION NO. : 18/737090  
DATED : January 28, 2025  
INVENTOR(S) : Ludovic Heyberger Page 1 of 1

It is certified that error appears in the above-identified patent and that said Letters Patent is hereby corrected as shown below:

In the Specification

In Column 11, Line 18, delete "I/O" and insert --(I/O)-- therefor

In Column 17, Line 6, after "processors", delete "1004"

Signed and Sealed this  
Fifteenth Day of April, 2025

Coke Morgan Stewart  
*Acting Director of the United States Patent and Trademark Office*